United States Patent
Greenhalgh et al.

[15] 3,691,209
[45] Sept. 12, 1972

[54] ANTHRAQUINONE DYESTUFFS

[72] Inventors: Colin William Greenhalgh; David Francis Newton, both of Manchester, England

[73] Assignee: Imperial Chemical Industries Limited, London, England

[22] Filed: May 15, 1969

[21] Appl. No.: 825,064

[52] U.S. Cl. ............................260/378, 8/39, 8/40, 260/370, 260/371, 260/373, 260/374, 260/375, 260/376, 260/377, 260/380, 260/381, 260/383, 260/303

[51] Int. Cl. .....................................C09b 1/50

[58] Field of Search......260/377, 378, 380, 381, 383, 260/384

[56] References Cited

UNITED STATES PATENTS 3,507,887   4/1970   Johnson.....................260/383

*Primary Examiner*—Lorraine A. Weinberger
*Assistant Examiner*—Robert Gerstl
*Attorney*—Cushman, Darby & Cushman

[57] ABSTRACT

Anthraquinone dyestuff of the formula:

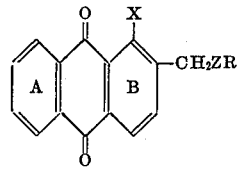

wherein X is hydroxy or amino; R is hydroxy, alkoxy, mercapto or alkylmercapto, Z is an optionally further substituted phenylene or naphthylene radical; and the rings A and B can contain substituents; and the use of the said dyestuffs for coloring textile materials.

4 Claims, No Drawings

ANTHRAQUINONE DYESTUFFS

This invention relates to anthraquinone dyestuffs which are valuable for coloring textile materials in particular synthetic textile materials.

According to the invention there are provided the anthraquinone dyestuffs of the formula:

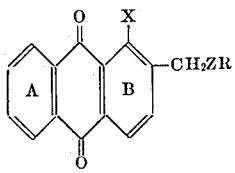

wherein X is a hydroxy or amino group, R is a hydroxy, alkoxy, mercapto or alkylmercapto group, Z is a phenylene or naphthylene radical which can contain further substituents, and the rings A and B can contain substituents.

The alkoxy radicals represented by R are preferably lower alkoxy radicals such as methoxy, ethoxy, n-propoxy and n-butoxy radicals. The alkyl mercapto radicals represented by R are preferably lower alkyl mercapto groups such as methylmercapto and ethylmercapto radicals.

Throughout this Specification the terms lower alkyl and lower alkoxy are used to denote alkyl and alkoxy radicals respectively containing from one to four carbon atoms.

As examples of further substituents which may be present in the phenylene or naphthylene radicals represented by Z there may be mentioned lower alkyl such methyl, chlorine, lower alkoxy such as methoxy, and hydroxy.

As examples of substituents which may be present on the rings A and B there may be mentioned chlorine, bromine, cyano, lower alkyl such as methyl, hydroxy, lower alkoxy such as methoxy, amino, lower alkylamino such as methylamino, acylamino such as acetylamino and benzoylamino, anilino and substituted derivatives thereof such as chloroanilino, bromoanilino, lower alkoxy anilino such as anisidino, lower alkyl anilino such as toluidino and 2:4:6-trimethylanilino, sulphoanilino and carboxyanilino, sulphonic acid, sulphonamido and N-substituted derivatives thereof such as sulphon-N-methylamido and sulphon-N:N-diethylamido, mercapto, lower alkyl-mercapto such as methylmercapto, and phenylmercapto.

According to a further feature of the invention there is provided a process for the manufacture of the anthraquinone dyestuff's of the invention which comprises reacting an anthraquinone compound of the formula:

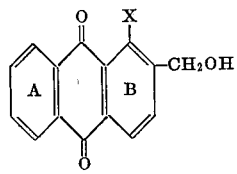

Formula I with a compound of the formula HZR in the presence of an acid catalyst, wherein A, B, R, X and Z have the meanings stated.

This process of the invention can be conveniently carried out by stirring the reactants together in an organic solvent, which can be an excess of the compound of the formula HZR, in the presence of an acid catalyst such as sulphuric acid, the reaction being carried out at temperatures between 20°C. and the boiling point of the reaction medium. Lewis Acid Catalysts such as aluminum chloride or zinc chloride can also be used as acid catalysts. The resulting dyestuffs can then be isolated by conventional methods, for example by removing the organic solvents by distillation in the presence of steam or by adding a liquid, such as methanol, which is a solvent for the organic solvents but in which the dyestuff is insoluble and can then be isolated by filtration.

As examples of compounds of the formula HZR which can be used there may be mentioned phenol, anisole, phenetole, thiophenol, o-cresol, p-cresol, o-chlorophenol, 4-methoxyphenol, o-, m- or p-dimethoxybenzene, thioanisole, hydroquinone, resorcinol, 2- or 4-methoxyphenol, 2- or 4- ethoxyphenol and α- or β-naphthol.

In this reaction the methylene group which is attached to the anthraquinone nucleus becomes attached to the phenylene or naphthylene radical represented by Z in para position to the group represented by R; but when the para position is already occupied by a substituent then the methylene group attaches itself to Z in ortho position to R. However when the compound of the formula HZR contains two groups, such as hydroxy and methoxy groups, which can both influence the position of attachment of the methylene group, then a mixture of products is likely to be obtained.

The anthraquinone compounds of Formula I can themselves be obtained by treating an optionally substituted 1-(hydroxy- or amino-) anthraquinone-2-sulphonic acid with formaldehyde in the presence of an alkali and a reducing agent by the methods which are described and claimed in British spec. Pat. No. 1,152,244.

As specific examples of the anthraquinone compounds of Formula I there may be mentioned 1-(hydroxy- or amino-)-2-hydroxymethylanthraquinone, 1-(hydroxy- or amino)-2-hydroxymethyl-4-(anilino-, methylanilino-, methoxyanilino-, 2:4:6-trimethylanilino-, chloroanilino-, phenylthio-, benzthiazol-2'-ylthio-, chloro-, bromo- or hydroxy-) anthraquinone and 1-amino-2-hydroxymethyl-5-(chloro- or sulpho-) anthraquinone.

According to a further feature of the invention there is provided an alternative process for the manufacture of the anthraquinone dyestuffs of the invention which comprises reacting an anthraquinone compound of the formula :-

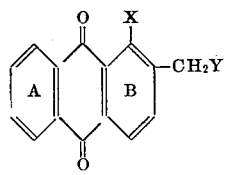

Formula II with a compound of the formula HZR, wherein A, B, R, X and Z have the meanings stated, and Y is a chlorine or a bromine atom.

This process of the invention can be conveniently carried out by heating the reactants together in an organic liquid, which if desired can be an excess of the compound of the formula HZR, optionally in the presence of an acid-binding agent which can be the sodium salt of the compound of the formula HZR. The resulting dyestuffs can then be isolated by conventional means, for example by adding a liquid such as water which will precipitate the dyestuff from its solution in the organic liquid.

The anthraquinone compounds of Formula II can themselves be obtained by treating the corresponding compounds of Formula I with a chlorinating or brominating agent.

The anthraquinone dyestuffs of the invention wherein R represents a hydroxy or mercapto group can be converted to the corresponding alkylated or acylated derivatives thereof by treatment with an alkylating agent, such as dimethylsulphate, or an acylating agent such as acetic anhydride, acetylchloride, benzoyl chloride or methane sulphonyl chloride, under the conditions normally employed for alkylation and acylation reactions.

A preferred class of the anthraquinone dyestuffs of the invention comprises those dyestuffs which are free from acidic water-solubilizing groups and which are represented by the formula:

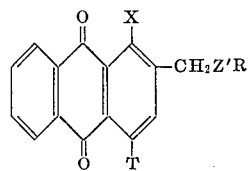

wherein X and R have the meanings stated, Z' is an optionally substituted phenylene radical, and T is a hydrogen atom or a substituent. X preferably represents an amino group and R is preferably hydroxy or alkoxy. The substituents represented by T are preferably hydroxy, phenylthio, benzthiazol-2'-ylthio-, p-toluenesulphonamido and, above all, optionally substituted anilino.

The anthraquinone dyestuffs of the invention which contain sulphonic acid groups are valuable as Acid Dyestuffs for coloring wool, silk and synthetic polyamide textile materials, such dyestuffs being applied to the said materials from aqueous dyebaths which can contain conventional dyeing assistants, for example formic acid, acetic acid, sulphuric acid, sodium sulphate or ammonium sulphate. The resulting colorations have excellent fastness to the tests which are commonly applied to such textile materials.

Anthraquinone dyestuffs of the invention which are free from acidic water-solubilizing groups are valuable for coloring synthetic textile materials, for example cellulose acetate and cellulose triacetate textile materials, polyamide textile materials such as polyhexamethyleneadipamide textile materials, polyacrylonitrile textile materials and preferably aromatic polyester textile materials such as polyethylene terephthalate textile materials. Such textile materials can be in the form of threads, yarn, or woven or knitted fabric. If desired the said synthetic textile materials can be in the form of blends with other textile materials, for example blends of polyester textile materials with cellulose or woolen textile materials.

Such textile materials can be conveniently colored with the water-insoluble anthraquinone dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85°C. ; in the case of cellulose triacetate or polyamide textile material it is preferred to carry out the dyeing process at 95° to 100°C. ; in the case of aromatic polyester textile materials the dyeing process can either be carried out at a temperature between 90° and 100°C., preferably in the presence of a carrier such as diphenyl or o-hydroxydiphenyl, or at a temperature above 100°C., preferably at a temperature between 120° and 140°C. under superatmospheric pressure.

Alternatively the aqueous dispersion of the said anthraquinone dyestuff can be applied to the textile material by a padding or printing process, followed by heating at a temperature up to 230°C., depending on the textile material, or by steaming of the textile material. In such processes it is preferred to incorporate a thickening agent, such as gum tragacanth, gum arabic, or sodium alginate, into the aqueous dispersion of the said azo dyestuff.

At the conclusion of the coloring process it is preferred to give the colored textile material a rinse in water or a brief soaping treatment before finally drying the colored textile material. In the case of aromatic polyester textile materials it is preferred to subject the colored textile material to a treatment in an alkaline aqueous solution of sodium hydrosulphite before the soaping treatment in order to remove loosely attached dyestuff from the surface of the textile material.

The said anthraquinone dyestuffs have excellent affinity and building up properties on synthetic textile materials, and in particular on aromatic polyester textile materials, so enabling deep shades to be obtained. The resulting colorations have excellent fastness to light, to wet treatments, and, in particular, to dry heat treatments such as those carried out at high temperatures during pleating operation.

If desired the said anthraquinone dyestuffs of the invention can be applied to synthetic textile materials in conjunction with other disperse dyes, such as are described in, for example, British Specs. Pat. Nos. 806271, 835819, 840903, 847175, 852396, 852493, 859899, 865328, 872204, 894012, 908656, 909843, 910306, 913856, 919424, 944513, 944722, 953887, 959816, 960235, 961412, 976218, 993162 and 998858.

The anthraquinone dyestuffs of the invention wherein the radical represented by ZR is a 1:4-dihydroxphenyl radical are also of value as dye developers in color photographic dye transfer processes such as are described and claimed in British Spec. Pat. No. 804971.

The invention is illustrated but not limited by the following Examples in which the parts and percentages are by weight.

EXAMPLE 1

A mixture of 2 parts of 1-amino-2-chloromethylanthra-quinone and 20 parts of phenol is stirred for 2 hours at 70°C. Forty Parts of water are then added and the precipitated product is filtered off and washed with a 10 percent aqueous solution of methanol. The solid is dissolved in 200 parts of a 10 percent aqueous solution of sodium hydroxide at 90°C., the solution is filtered, and the filtrate acidified with aqueous hydrochloric acid. The precipitated 1-amino-2-(4'-hydroxybenzyl)anthraquinone is then filtered off, washed with water and dried.

When dispersed in aqueous medium the so-obtained dyestuff dyes polyester textile materials in bright orange shades of excellent fastness properties.

In place of the 2 parts of 1-amino-2-chloromethylanthraquinone used in the above Example there are used the corresponding amounts of 1-amino-2-chloromethyl-5-chloroanthraquinone, 1-amino-2-chloromethyl-4-anilinoanthraquinone and 1-amino-2-chloromethyl-4-(p-toluidino)anthraquinone whereby there are obtained respectively 1-amino-2-(4'-hydroxybenzyl)-5-chloro-anthraquinone or 1-amino-2-(4'-hydroxybenzyl)-4-(anilino- or p-toluidino)anthraquinone, which dye polyester textile materials in yellow, blue and blue shades respectively of excellent fastness properties.

EXAMPLE 2

A mixture of 2 parts of 1-hydroxy-2-chloromethyl-anthraquinone, 40 parts of phenol and 20 parts of sodium phenate is heated for 2 hours at 110°C. The mixture is then cooled, poured into water and the precipitated 1-hydroxy-2-(4'-hydroxybenzyl) anthraquinone is filtered off, washed with a mixture of methanol and water, and dried.

When dispersed in aqueous medium the product dyes polyester textile materials in yellow shades of excellent fastness properties.

EXAMPLE 3

A mixture of 2 parts of 1-amino-2-hydroxymethylanthraquinone, 20 parts of phenol and 0.25 part of 98 percent sulphuric acid is stirred for 2 hours at 70°C. The mixture is cooled, poured into a mixture of methanol and water (1:3), and the precipitated 1-amino-2-(4'-hydroxybenzyl)anthraquinone is filtered off, washed with water and dried.

The following Table gives further Examples of the anthraquinone dyestuffs of the invention which were obtained, using methods similar to that described in Example 3, by reacting the anthraquinone compounds listed in the second column of the Table with the phenolic compounds listed in the third column of the Table. The fourth column of the Table gives the constitutions of the resulting dyestuffs, while the fifth column gives the shades obtained when the dyestuffs are applied to polyester textile materials.

| Example | Anthraquinone compound | Phenolic compound | Constitution of dyestuff | Shade |
|---|---|---|---|---|
| 4 | 1-amino-2-hydroxymethyl-4-anilino anthraquinone | Phenol | 1-amino-2-(4'-hydroxybenzyl)-4-anilino anthraquinone | Blue. |
| 5 | 1-amino-2-hydroxymethyl-4-(p-toluene sulphonamido) anthraquinone | do | 1-amino-2-(4'-hydroxybenzyl)-4-(p-toluenesulphonamido)anthraquinone | Red. |
| 6 | 1-amino-2-hydroxymethyl-4-(benzthiazol-2'-ylthio)-anthraquinone | do | 1-amino-2-(4'-hydroxybenzyl)-4-(benzthiazol-2"-ylthio)anthraquinone | Red. |
| 7 | 1-amino-2-hydroxymethyl-4-hydroxyanthraquinone | do | 1-amino-2-(4'-hydroxybenzyl)-4-hydroxyanthraquinone | Red. |
| 8 | 1-amino-2-hydroxymethyl-4-phenylthioanthraquinone | do | 1-amino-2-(4'-hydroxybenzyl)-4-phenylthioanthraquinone | Red. |
| 9 | 1-amino-2-hydroxymethyl-4-(p-anisidino)anthraquinone | do | 1-amino-2-(4'-hydroxybenzyl)-4-(p-anisidino)anthraquinone | Blue. |
| 10 | 1-amino-2-hydroxymethyl-4-(p-chloroanilino)anthraquinone | do | 1-amino-2-(4'-hydroxybenzyl)-4-(p-chloroanilino)anthraquinone | Do. |
| 11 | 1:5-dihydroxy-4:8-diamino-2-(4'-hydroxyphenyl)-6-hydroxymethylanthraquinone | do | 1:5-dihydroxy-4:8-diamino-2-(4'-hydroxyphenyl)-6-(4"-hydroxybenzyl)anthraquinone | Do. |
| 12 | 1-amino-2-hydroxymethylanthraquinone | Phenetole | 1-amino-2-(4'-ethoxybenzyl)anthraquinone | Orange. |
| 13 | do | Anisole | 1-amino-2-(4'-methoxybenzyl)anthraquinone | Do. |
| 14 | 1-amino-2-hydroxymethyl-4-anilinoanthraquinone | do | 1-amino-2-(4'-methoxybenzyl)-4-anilinoanthraquinone | Blue. |
| 15 | do | Thiophenol | 1-amino-2-(4'-mercaptobenzyl)-4-anilinoanthraquinone | Do. |
| 16 | 1-amino-2-hydroxymethylanthraquinone | p-Cresol | 1-amino-2-(2'-hydroxy-5'-methylbenzyl)-anthraquinone | Orange. |

EXAMPLE 17

A mixture of 2 parts of 1-amino-2-hydroxymethylanthraquinone, 25 parts of o-cresol and 1 part of aluminum chloride is stirred for 15 minutes at 100°C. The mixture is cooled, poured into 15 parts of methanol and the precipitated solid is filtered off. The solid is dissolved in a hot mixture of 50 parts of methanol and 10 parts of an 8 percent aqueous sodium hydroxide solution, the solution is filtered, the filtrate acidified with acetic acid, and the precipitated 1-amino-2-(3'-methyl-4'-hydroxybenzyl)anthraquinone is filtered off, washed with methanol and dried.

When dispersed in aqueous medium the dyestuff so obtained dyes polyester textile materials in bright orange shades of excellent fastness properties.

The same dyestuff is obtained when the 1 part of aluminum chloride used in the above example is replaced by 1 part of zinc chloride.

The following Table gives further Examples of the anthraquinone dyestuffs of the invention which were obtained, using methods similar to that described in Example 17, by reacting the anthraquinone compounds listed in the second column of the Table with the phenolic compounds listed in the third column of the Table. The fourth column gives the constitutions of the resulting dyestuffs, while the fifth column gives the shades obtained when the dyestuffs are applied to polyester textile materials.

| Example | Anthraquinone compound | Phenolic compound | Constitution of dyestuff | Shade |
|---|---|---|---|---|
| 18 | 1-amino-2-hydroxymethylanthraquinone. | o-Chlorophenol | 1-amino-2-(3'-chloro-4'-hydroxybenzyl)-anthraquinone | Orange. |
| 19 | do | 4-methoxyphenol | Mixture of 1-amino-2-(2'-hydroxy-5'-methoxybenzyl)anthraquinone and 1-amino-2-(2'-methoxy-5'-hydroxybenzyl) anthraquinone. | Do. |
| 20 | 1-amino-2-hydroxymethyl-4-(benzthiazol-2'-ylthio)anthraquinone. | o-Dimethoxy-benzene | 1-amino-2-(3'':4''-dimethoxybenzyl)-4-(benzthiazol-2'-ylthio)anthraquinone. | Red. |
| 21 | do | 2-methoxy-phenol | Mixture of 1-amino-2-(3''-hydroxy-4''-methoxybenzyl)-4-(benzthiazol-2'-ylthio)anthraquinone and 1-amino-2-(3''-methoxy-4''-hydroxybenzyl)-4-benzthiazol-2'-ylthio) anthraquinone. | Red. |
| 22 | 1-amino-2-hydroxymethyl-4-anilinoanthraquinone. | m-Dimethoxy-benzene | 1-amino-2-(2':4'-dimethoxybenzyl)-4-anilinoanthraquinone. | Blue. |
| 23 | do | 4-chloro-3-methylphenol | 1-amino-2-(2'-hydroxy-4'-methyl-5'-chlorobenzyl)-4-anilinoanthraquinone. | Do. |
| 24 | do | Thioanisole | 1-amino-2-(4'-methylmercaptobenzyl)-4-anilinoanthraquinone. | Do. |

EXAMPLE 25

1 Part of 1-amino-2-(4'-hydroxybenzyl)anthraquinone (which was obtained as described in Example 1 ) is dissolved in 200 parts of a 2.5 percent aqueous solution of sodium hydroxide at 20°C. 3 Parts of dimethyl-sulphate are added and the temperature is raised to 50°C. to complete the reaction. The precipitated 1-amino-2-(4'-methoxybenzyl)anthraquinone is then filtered off, washed with water and dried.

EXAMPLE 26

A mixture of 3 parts of acetic anhydride, 1 part of 1-amino-2-(4'-hydroxybenzyl)anthraquinone and 25 parts of pyridine is stirred for 30 minutes at 25°C. The mixture is then poured into water, and the precipitated 1-amino-2-(4'-acetoxybenzyl)anthraquinone is filtered off, washed with water and dried.

When dispersed in aqueous medium the dyestuff so obtained dyes polyester textile materials in bright orange shades of excellent fastness properties.

EXAMPLE 27

A mixture of 2 parts of 1-amino-20hydroxymethyl-4-anilinoanthraquinone, 6 parts of hydroquinone and 10 parts of nitrobenzene is heated at 100°C. and 1.38 parts of aluminum chloride are added. The mixture is heated for one-half hour at 100°C, then cooled and poured into methanol. Water is then added to the resulting mixture until all the 1-amino-2-(2':5'-dihydroxybenzyl)-4-anilinoanthraquinone is precipitated. The solid is then filtered off, washed with water and dried.

The product dyes polyester textile materials in blue shades of excellent fastness properties.

1-Amino-2-(2':4'-dihydroxybenzyl)-4-anilinoanthraquinone is similarly obtained when resorcinol is used in place of hydro-quinone in the above Example.

1-Amino-2-(2'-hydroxynaphth-1'-ylmethyl)-4-anilinoanthraquinone and 1-amino-2-(4'-hydroxynaphth-1'-ylmethyl)-4-anilinoanthraquinone are similarly obtained when the hydroquinone used in the above Example is replaced by β-naphthol and α-naphthol respectively.

WE CLAIM:

1. The water-insoluble anthraquinone dyestuff of the formula :-

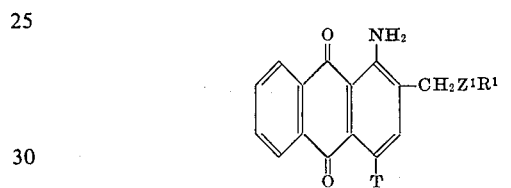

wherein $R^1$ alkoxyanilino. selected from the class consisting of hydroxy and lower alkoxy, $Z^1$ is selected from the class consisting of phenylene, hydroxyphenylene, lower alkoxyphenylene, chlorophenylene and lower alkylphenylene; and T is selected from the class consisting of hydrogen, anilino, chloroanilino, lower alkylanilino and lower alkoxy anilino.

2. A water-insoluble anthraquinone dyestuff as claimed in claim 2 wherein T is hydrogen, anilino, chloroanilino, lower alkyl-anilino and lower alkoxy-anilino.

3. A water-insoluble anthraquinone dyestuff as claimed in claim 2 wherein R' is hydroxy, Z' is phenylene, and T is anilino.

4. A water-insoluble anthraquinone dyestuff as claimed in claim 3 which is 1-amino-2-(4'-hydroxybenzyl)- 4-anilinoanthraquinone.

* * * * *